US011532037B2

(12) United States Patent
Igata et al.

(10) Patent No.: US 11,532,037 B2
(45) Date of Patent: Dec. 20, 2022

(54) RENTAL FEE SETTING APPARATUS, RENTAL FEE SETTING METHOD AND RENTAL FEE SETTING SYSTEM

(71) Applicant: TOYOTA JIDOSHA KABUSHIKI KAISHA, Toyota (JP)

(72) Inventors: Hiroshi Igata, Yokohama (JP); Shin Sakurada, Toyota (JP); Kuniaki Jinnai, Nagoya (JP); Motoyoshi Hatta, Anjo (JP); Shota Hirose, Toyoake (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 16/195,954

(22) Filed: Nov. 20, 2018

(65) Prior Publication Data

US 2019/0156408 A1    May 23, 2019

(30) Foreign Application Priority Data

Nov. 21, 2017    (JP) .............................. JP2017-223816

(51) Int. Cl.
*G06Q 30/06* (2012.01)
*G06Q 30/02* (2012.01)

(52) U.S. Cl.
CPC ..... *G06Q 30/0645* (2013.01); *G06Q 30/0283* (2013.01)

(58) Field of Classification Search
None
See application file for complete search history.

(56) References Cited

U.S. PATENT DOCUMENTS

| 2014/0207498 A1 | 7/2014 | Cho |
| 2015/0206229 A1* | 7/2015 | Kang ................. G06Q 30/0645 |
| | | 705/26.3 |
| 2021/0148986 A1* | 5/2021 | Dong ................... G01R 31/367 |

FOREIGN PATENT DOCUMENTS

| JP | H10254978 A | 9/1998 |
| JP | 2013-084199 A | 5/2013 |
| JP | 2013-232129 A | 11/2013 |
| JP | 2016085509 A | 5/2016 |
| JP | 2017005776 A | 1/2017 |

* cited by examiner

*Primary Examiner* — Jan P Mincarelli
(74) *Attorney, Agent, or Firm* — Hunton Andrews Kurth LLP

(57) ABSTRACT

A management server is configured to perform a process including: obtaining, when an electric vehicle is returned, returning date and time, a returning location, and a use history of a vehicle; setting a fee-returning rate in accordance with a SOC at the time of renting, a SOC at the time of returning, the number of times of performing behaviors contributing to deterioration of a battery, and a leaving time in a state contributing to the deterioration of the battery; setting a correction coefficient in accordance with a cause of a behavior contributing to the deterioration; setting the fee-returning rate in accordance with the returning location and the returning time; determining the fee-returning rate; and performing a process for providing points corresponding to the fee-returning amount.

11 Claims, 5 Drawing Sheets

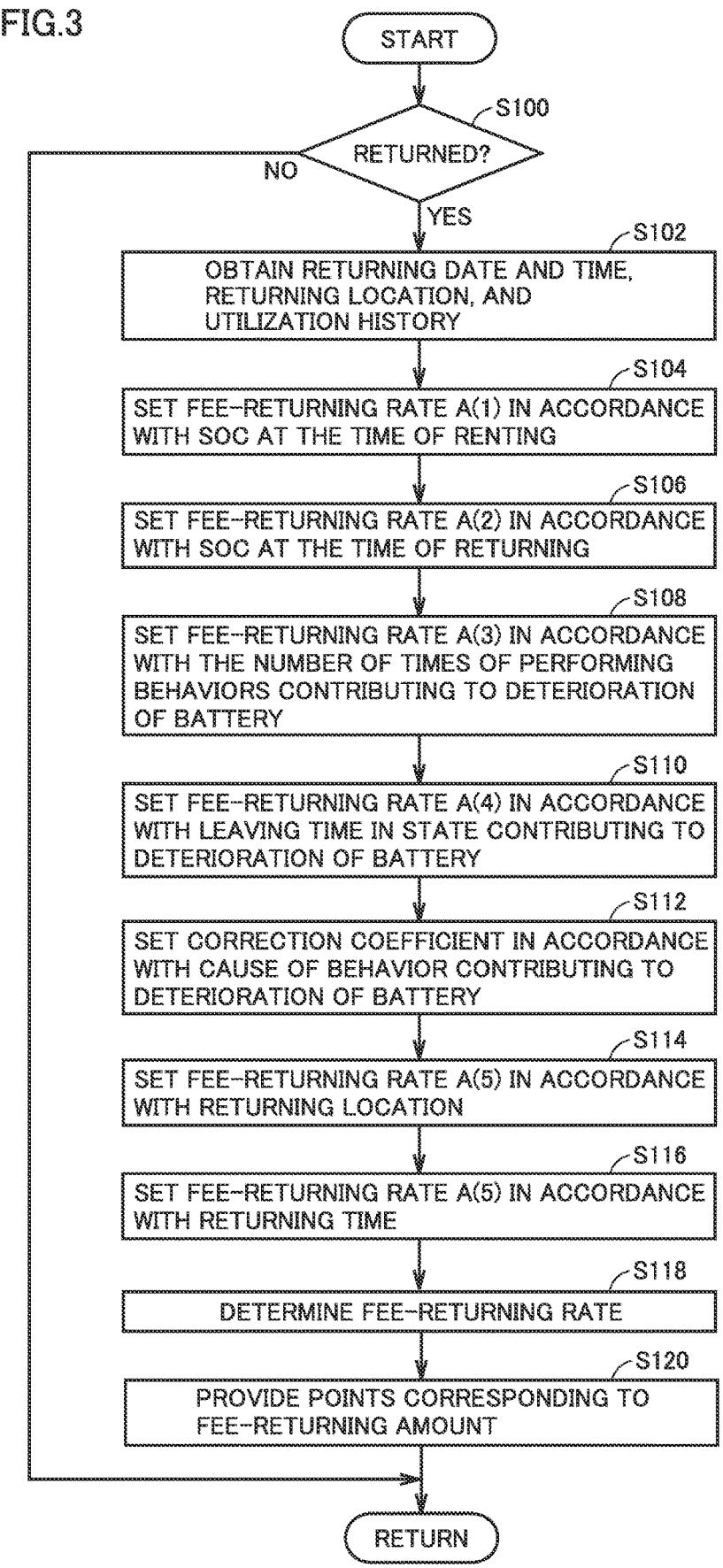

FIG.4

| SOC AT THE TIME OF RENTING | FEE-RETURNING RATE |
|---|---|
| LARGE VALUE AREA | 0% |
| MEDIUM VALUE AREA | 2% |
| SMALL VALUE AREA | 5% |

FIG.5

| SOC AT THE TIME OF RETURNING | FEE-RETURNING RATE |
|---|---|
| LARGE VALUE AREA | 5% |
| MEDIUM VALUE AREA | 2% |
| SMALL VALUE AREA | 0% |

FIG.6

| THE NUMBER OF TIMES OF PERFORMING BEHAVIORS CONTRIBUTING TO DETERIORATION | FEE-RETURNING RATE |
|---|---|
| LARGE VALUE AREA | 0% |
| MEDIUM VALUE AREA | 2% |
| SMALL VALUE AREA | 5% |

FIG.7

| LEAVING TIME IN STATE CONTRIBUTING TO DETERIORATION | FEE-RETURNING RATE |
|---|---|
| LONG PERIOD | 0% |
| MEDIUM PERIOD | 2% |
| SHORT PERIOD | 5% |

FIG.8

| CAUSE OF DETERIORATION | CORRECTION COEFFICIENT |
|---|---|
| DRIVING HISTORY OF USER | 0.5 |
| BATTERY PERFORMANCE | 1.0 |

FIG.9

| RETURNING LOCATION | FEE-RETURNING RATE |
|---|---|
| IN PREDEFINED RANGE | 5% |
| OUTSIDE PREDEFINED RANGE | 0% |

FIG.10

| RETURNING TIME | FEE-RETURNING RATE |
|---|---|
| IN PREDEFINED TIME ZONE | 5% |
| OUTSIDE PREDEFINED TIME ZONE | 0% |

RENTAL FEE SETTING APPARATUS, RENTAL FEE SETTING METHOD AND RENTAL FEE SETTING SYSTEM

This nonprovisional application is based on Japanese Patent Application No. 2017-223816 filed on Nov. 21, 2017, with the Japan Patent Office, the entire contents of which are hereby incorporated by reference.

BACKGROUND

Field

The present disclosure relates to setting a rental fee for an electric vehicle.

Description of the Background Art

A conventionally known rental system rents an electric vehicle, a battery mounted therein, and the like to a user and collects a rental fee. For example, Japanese Patent Laying-Open No. 2013-084199 discloses a technique in which use history data of an electric vehicle is obtained when ending rental of the electric vehicle and an additional fee is set when a degree of deterioration of a battery thereof is expected to be larger than that in a general case.

SUMMARY

In such an electric vehicle rental system, for example, if the SOC (State Of Charge) of the battery mounted in the electric vehicle after the electric vehicle is returned is low, a charging time may need to be secured. As a result, it takes a time until a next request for rental can be accepted, with the result that the electric vehicle may be unable to be rented efficiently. Hence, it is required to set a rental fee for providing a user with a motivation for returning the electric vehicle in such a manner that the returned vehicle can be smoothly rented next.

An object of the present disclosure is to provide a rental fee setting apparatus, a rental fee setting method and a rental fee setting system each for setting a rental fee for providing a user with a motivation for returning an electric vehicle in such a manner that the electric vehicle can be rented efficiently.

A rental fee setting apparatus according to a certain aspect of the present disclosure is a rental fee setting apparatus configured to set a rental fee for an electric vehicle in which a power storage device is mounted. This rental fee setting apparatus includes: a storage device configured to store a SOC of the power storage device at a time of returning of the electric vehicle rented to a user; and a setting device configured to set a rental fee using the SOC at the time of returning, the SOC at the time of returning being stored in the storage device. When the SOC at the time of returning is large, the setting device is configured to set the rental fee to be lower than the rental fee set when the SOC at the time of returning is small.

In this way, when the SOC at the time of returning is large, the rental fee is lower than the rental fee set when the SOC at the time of returning is small, thereby providing the user with a motivation for returning the vehicle with a large SOC. As a result, when the electric vehicle is returned with a large SOC, a charging time to be secured becomes short, thereby shortening a time until a next request for rental can be accepted. As a result, the electric vehicle can be rented efficiently.

In a certain embodiment, the setting device is configured to set a current or subsequent rental fee using the SOC at the time of returning, the SOC at the time of returning being stored in the storage device.

In this way, the current or subsequent rental fee is set in accordance with the SOC at the time of returning, thereby providing the user with a motivation for returning the electric vehicle with a large SOC.

In a certain embodiment, in addition to the SOC at the time of returning, the storage device is configured to store a SOC of the power storage device at a time of renting of the electric vehicle. When the SOC at the time of renting is small, the setting device is configured to set the rental fee to be lower than the rental fee set when the SOC at the time of renting is large.

In this way, when the SOC at the time of renting is small, the rental fee is lower than the rental fee set when the SOC thereof is large, thereby providing the user with a motivation for renting an electric vehicle with a small SOC at the time of renting. As a result, a charging time to be secured becomes short, thereby shortening a time until a next request for rental can be accepted. Accordingly, the electric vehicle can be rented efficiently.

In a certain embodiment, in addition to the SOC at the time of returning, the storage device is configured to store a degree of deterioration of the power storage device at the time of returning. When the degree of deterioration of the power storage device at the time of returning is small, the setting device is configured to set the rental fee to be lower than the rental fee set when the degree of deterioration is large.

In this way, when the degree of deterioration at the time of returning is small, the rental fee is lower than the rental fee set when the degree of deterioration at the time of returning is large, thereby providing the user with a motivation for returning the vehicle with a small degree of deterioration. As a result, since the electric vehicle is returned with a small degree of deterioration, the life of the power storage device can be suppressed from being reduced significantly.

In a certain embodiment, in addition to the SOC at the time of returning, the storage device is configured to store, at the time of returning, information as to whether deterioration of the power storage device results from performance of the power storage device or results from a utilization manner of the user. When the deterioration of the power storage device results from the performance of the power storage device, the setting device is configured to set the rental fee to be lower than the rental fee set when the deterioration of the power storage device results from the utilization manner of the user.

In this way, when the deterioration of the power storage device does not result from the utilization history of the user, the rental fee becomes low, thereby providing the user with a motivation for the user to utilize the electric vehicle so as not to deteriorate the power storage device. As a result, the life of the power storage device can be suppressed from being reduced significantly.

In a certain embodiment, in addition to the SOC at the time of returning, the storage device is configured to store positional information of the electric vehicle at the time of returning. The setting device is configured to set the rental fee to be different between a case where a position of the electric vehicle at the time of returning is in a predefined range and a case where the position of the electric vehicle at the time of returning is outside the predefined range.

In this way, the rental fee is set in accordance with the position of the electric vehicle at the time of returning, whereby the rental fee can be set to be different between a case where the vehicle is returned to a location with a strong demand of rental and a case where the vehicle is returned to a location with a weak demand of rental. Accordingly, the user can be provided with a motivation for returning the electric vehicle to the location with a strong demand or the location with a weak demand.

In a certain embodiment, in addition to the SOC at the time of returning, the storage device is configured to store a clock time at the time of returning. The setting device is configured to set the rental fee to be different between a case where the time of returning is in a predefined time zone and a case where the time of returning is outside the predefined time zone.

In this way, the rental fee is set in accordance with the clock time at the time of returning, whereby the rental fee can be set to be different between a case where the vehicle is returned in a time zone with a strong demand of rental and a case where the vehicle is returned in a time zone with a weak demand of rental, for example. Accordingly, the user can be provided with a motivation for returning the electric vehicle in the time zone with a strong demand or the time zone with a weak demand.

A method according to another aspect of the present disclosure is a method for setting a rental fee for an electric vehicle in which a power storage device is mounted. This method includes: storing a SOC of the power storage device at a time of returning of the electric vehicle rented to a user; setting a rental fee using the stored SOC at the time of returning; and setting, when the SOC at the time of returning is large, the rental fee to be lower than the rental fee set when the SOC at the time of returning is small.

A rental fee setting system according to still another aspect of the present disclosure includes: an electric vehicle in which a power storage device is mounted; and a server configured to set a rental fee for the electric vehicle. The server is configured to store a SOC of the power storage device at a time of returning of the electric vehicle rented to a user. The server is configured to set the rental fee using the stored SOC at the time of returning. The server is configured to set, when the SOC at the time of returning is large, the rental fee to be lower than the rental fee set when the SOC at the time of returning is small.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 3 is a flowchart showing a rental fee setting process.

FIG. 4 is a diagram for illustrating an exemplary fee-returning rate set in accordance with an SOC at the time of renting.

FIG. 5 is a diagram for illustrating an exemplary fee-returning rate set in accordance with an SOC at the time of returning.

FIG. 6 is a diagram for illustrating an exemplary fee-returning rate set in accordance with the number of times of performing behaviors contributing to deterioration.

FIG. 7 is a diagram for illustrating an exemplary fee-returning rate set in accordance with a leaving time in a state contributing to the deterioration.

FIG. 8 is a diagram for illustrating an exemplary correction coefficient set in accordance with a cause of a behavior contributing to the deterioration.

FIG. 9 is a diagram for illustrating an exemplary fee-returning rate set in accordance with a returning location.

FIG. 10 is a diagram for illustrating an exemplary fee-returning rate set in accordance with a returning time.

DESCRIPTION OF THE PREFERRED EMBODIMENTS

Figure 1:
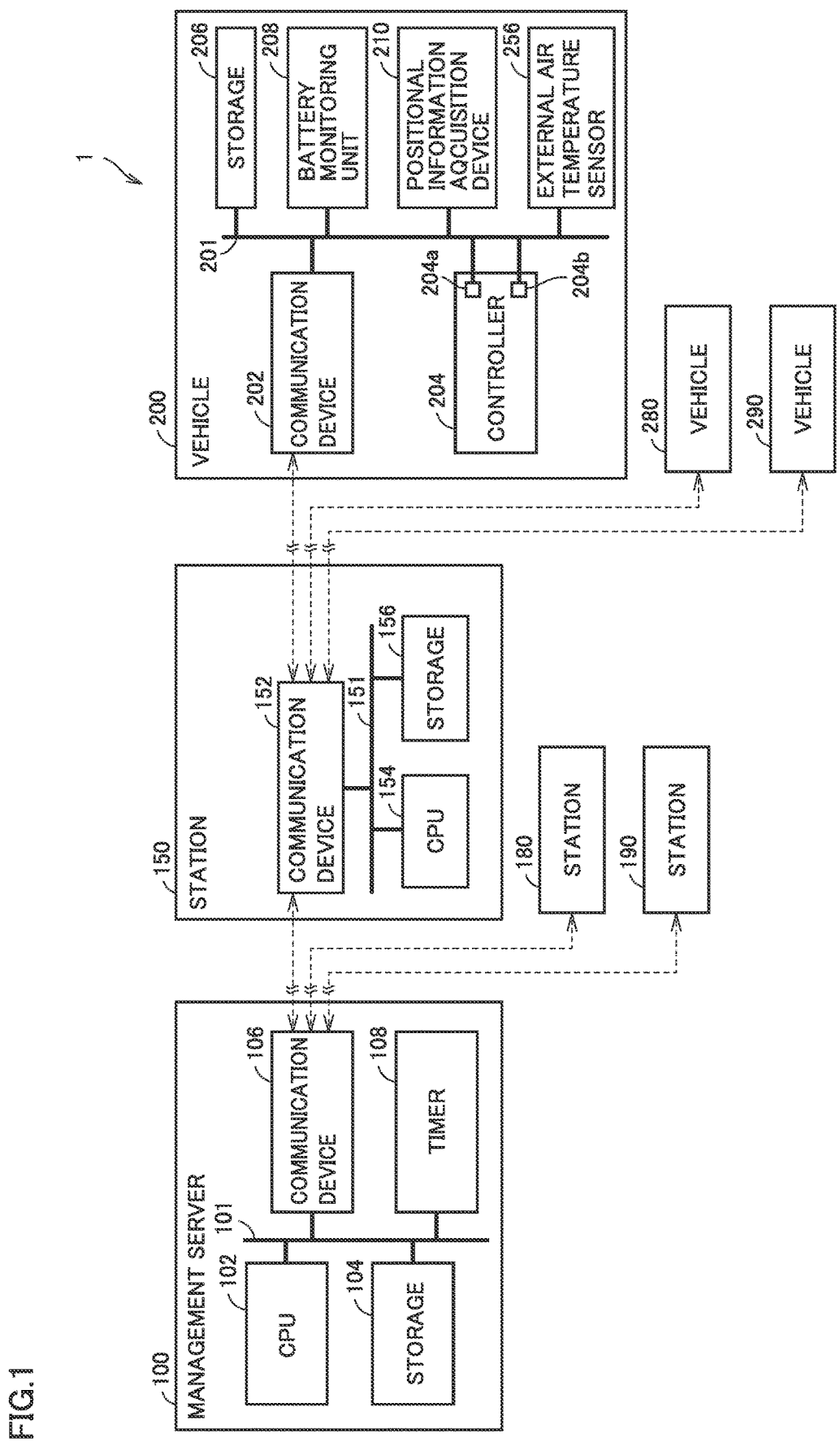
FIG. 1 is an overall configuration diagram of a rental fee setting system according to the present embodiment.

The following describes embodiments of the present disclosure with reference to figures in detail. It should be noted that the same or corresponding portions in the figures are given the same reference characters and are not described repeatedly.

<Configuration of Rental Fee Setting System>

FIG. 1 is an overall configuration diagram of a rental fee setting system 1 according to the present embodiment. As shown in FIG. 1, rental fee setting system 1 according to the present embodiment includes a management server 100, a station 150, and vehicles 200, 280 and 290 which are electric vehicles.

Management server 100 includes a CPU (Central Processing Unit) 102, a storage 104, a communication device 106, and a timer 108. Each component is communicatively connected by a communication bus 101.

CPU 102 is configured to execute prescribed computation processing based for example on information stored in storage 104, information received from vehicle 200 via station 150 and communication device 106, and/or the like, for example.

Storage 104 includes, for example, a memory such as a ROM (Read Only Memory) and a RAM (Random Access Memory), and a large-capacity storage device such as a hard disk or a solid state drive. For example, storage 104 stores: information (user list) for associating the plurality of vehicles 200, 280, and 290 with users of the respective vehicles; and information (for example, locations) about stations 150, 180 and 190, which can be renting locations or returning locations for vehicles 200, 280 and 290.

Communication device 106 is configured to communicate with a communication device 152 of station 150, for example. For example, communication device 106 and communication device 152 communicate information with each other through wireless communication or wired communication. Communication device 106 and communication device 152 may communicate via a relay point (a wireless base station), a prescribed communication network (for example, the Internet), or the like, or may communicate directly not via a relay point, a prescribed communication network or the like (for example, using a dedicated line). Moreover, communication device 106 is configured to also communicate with station 180 and station 190.

The wireless communications may be done in a wireless communication system capable of transmitting and receiving signals via a relay point utilizing a wireless LAN (Local Area Network) represented by IEEE 802.11, a wireless communication standard for a mobile phone such as 2G, 3G, 4G, 5G, etc., and the like, or may be done in a wireless communication system capable of transmitting and receiving signals directly between communication device 106 and communication device 152 and for example utilizing a wireless communication standard such as Bluetooth (Registered trademark) or the like. It should be noted that in the case of the wired communication, signals are transmitted and received using a predetermined communication line such as an electric wire or an optical fiber, for example.

Timer 108 counts the current date and time. For example, CPU 102 stores in storage 104 a result of counting time by timer 108. When reading the current date and time from storage 104, CPU 102 may correct the current date and time by an externally received digital signal (standard radio wave) including date information and time information.

Station 150 includes communication device 152, a CPU 154, and a storage 156. Each component is communicatively connected by a communication bus 151.

Communication device 152 is configured to communicate with communication device 106 of management server 100, and is also configured to communicate with a communication device 202 of vehicle 200, for example. For example, communication device 152 and communication device 202 communicate information with each other through wireless communication. The wireless communication between communication device 152 and communication device 202 is the same as the wireless communication between communication device 106 and communication device 152, and therefore will not be repeatedly described in detail.

CPU 154 is configured to execute prescribed computation processing based on, for example, information stored in storage 156, information received from management server 100 or vehicle 200 via communication device 152, and the like.

Storage 156 includes: a memory such as ROM or RAM; and a large-capacity storage device such as a hard disk or a solid-state drive, for example. For example, storage 156 stores: information for specifying stations (for example, specific stations ID provided to the respective stations); information for specifying the plurality of vehicles 200, 280 and 290 parked in station 150; information received from the plurality of vehicles 200, 280 and 290 (such as a below-described utilization history); and the like.

Station 150 relays communication between management server 100 and vehicle 200 and transmits, to management server 100, the information for specifying station 150 in which vehicle 200 is parked. Accordingly, based on the information received from station 150, management server 100 can specify the renting location or returning location for vehicle 200.

Vehicle 200 includes communication device 202, a controller 204, a storage 206, a battery monitoring unit 208, a positional information acquisition device 210, and an external air temperature sensor 256. Each component is communicatively connected by a communication bus 201.

For example, communication device 202 is configured to communicate with communication device 152 of station 150. Communication device 152 and communication device 202 wirelessly communicate as has been described above, and accordingly, how they do so will not be described redundantly.

Controller 204 includes, for example, a CPU 204a, a memory 204b (ROM and RAM), an input/output port for inputting and outputting various signals (not shown) and so forth. Controller 204 is configured to execute prescribed computation processing based on information stored in memory 204b and storage 206, information received from station 150 via communication device 202, and the like.

Storage 206 is a storage device that can store data of a larger size than memory 204b, and is, for example, a storage device composed of a nonvolatile memory, a hard disk, a solid state drive, or the like. Storage 206 stores the utilization history of vehicle 200, for example. For example, the utilization history of vehicle 200 includes: an external temperature history; a driving history of vehicle 200 (such as a traveled route); a quick electric charging history indicating the number of times of performing quick electric charging; a SOC (State Of Charge) history of a battery 214 (see FIG. 2) mounted in vehicle 200; and histories of voltage, current, and temperature of the battery; and the like.

Battery monitoring unit 208 detects a state of battery 214 mounted in vehicle 200. Battery monitoring unit 208 detects, for example, battery 214's voltage, current and temperature. Battery monitoring unit 208 calculates an estimated value of the SOC of battery 214 by using for example the detected voltage, current and temperature of battery 214. The SOC may be estimated using a well-known technique, and it will not be described specifically. Note that the SOC may be estimated by controller 204 rather than battery monitoring unit 208.

Positional information acquisition device 210 is configured to obtain the current position of vehicle 200. For example, positional information acquisition device 210 may obtain the current position of vehicle 200 by using GPS (Global Positioning System), or may obtain the current position of vehicle 200 by using positional information of a wireless communication device located outside vehicle 200 and capable of communicating with communication device 106. Positional information acquisition device 210 transmits to controller 204 a signal indicating the current position of vehicle 200 as obtained.

External air temperature sensor 256 senses the temperature around vehicle 200 (hereinafter referred to as external air temperature). External air temperature sensor 256 transmits a signal indicating the sensed external air temperature to controller 204. It should be noted that controller 204 causes storage 206 to store, as the utilization history, a variety of information based on the signals received from battery monitoring unit 208, positional information acquisition device 210, and external air temperature sensor 256.

Figure 2:
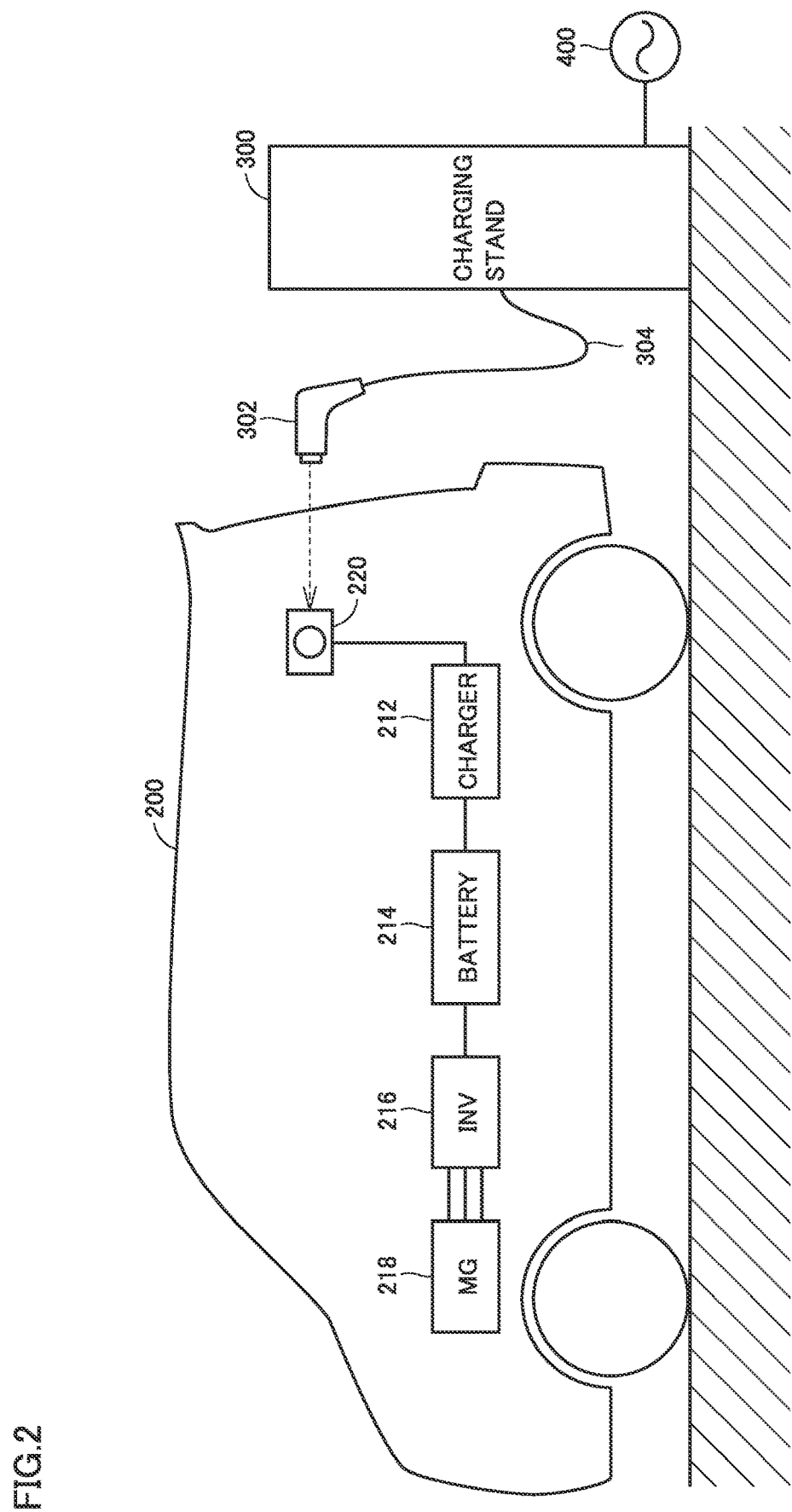
FIG. 2 is a diagram showing an example of a configuration of an electric vehicle.

Vehicle 200 is an electric vehicle using an electric motor as a driving power source. FIG. 2 is a diagram showing an example of a configuration of an electric vehicle.

As shown in FIG. 2, vehicle 200 further includes a charger 212, battery 214, an inverter 216, a motor generator 218, and an inlet 220.

When a charging connector 302 of a charging stand 300 is attached to inlet 220, charger 212 charges battery 214 with power supplied from an external power supply 400.

Battery 214 is configured using, for example, a secondary battery such as a nickel metal hydride battery or a lithium ion battery. Battery 214 may be any power storage device capable of storing power, and for example, a large-capacity capacitor may be used instead of battery 214.

Inverter 216 is a power conversion device which converts power between AC power and DC power. Inverter 216 may for example convert DC power of battery 214 into AC power and supply it to motor generator 218. Further, inverter 216 may for example receive AC power (regenerative power) from motor generator 218, convert it into DC power, and supply it to battery 214 to electrically charge battery 214 therewith.

Motor generator 218 receives power supplied from inverter 216 and provides rotational force to a drive wheel 222. Drive wheel 222 is rotated by the rotational force provided by motor generator 218 to drive vehicle 200.

Inlet 220 is provided in vehicle 200 at an exterior portion of vehicle 200 together with a cover (not shown) such as a lid. Inlet 220 has a shape allowing charging connector 302 to be attached thereto. Inlet 220 and charging connector 302 both have contacts, respectively, incorporated therein, and when charging connector 302 is attached to inlet 220, the contacts come into contact with each other, and inlet 220 and charging connector 302 are thus electrically connected together.

Charging stand 300 is installed outside vehicle 200 and connected to charging connector 302 via a charging cable 304. Charging stand 300 is electrically connected to power supply 400, and when charging connector 302 is attached to inlet 220, the power of power supply 400 is supplied via charging stand 300, charging cable 304, and charging connector 302 to vehicle 200.

Vehicles 280 and 290 are similar in configuration to vehicle 200. Accordingly, they will not be described redundantly.

Moreover, charging stand 300 may be installed in at least one of stations 150, 180 and 190, for example. For example, when charging stand 300 is installed in station 150, station 150 may obtain the utilization history of vehicle 200 via charging stand 300, charging cable 304, and charging connector 302 using power line communication or the like.

<Utilization Manner of Electric Vehicle>

In the present embodiment, as a utilization manner of an electric vehicle, for example, a user can select for example any of: leasing an electric vehicle until a prescribed term of a contract (of one year or plural years) expires (i.e., leasing); setting a fee per unit period of time and collecting when a vehicle is returned a rental fee depending on a period of time for which the vehicle is utilized (i.e., renting); and allowing a plurality of people to share one or more electric vehicles until a prescribed term of a contract expires (i.e., sharing).

Of these utilization manners, for example, when an electric vehicle is utilized by rental, a rental fee depending on utilizing the vehicle may be set when returning vehicle 200. Alternatively, for example, when an electric vehicle is utilized by leasing, a rental fee may be set for each prescribed period of time (for example of one month). Furthermore, for example, when an electric vehicle is utilized by sharing, an amount obtained by adding a fee for each prescribed period of time and a fee depending on utilizing the vehicle may be set as a rental fee.

Among the fees thus set, the fee depending on utilizing the vehicle is normally calculated by multiplying the utilization time by the fee per unit time at the time of returning. In such an electric vehicle rental fee setting system, if the SOC of the battery mounted in the electric vehicle after the electric vehicle is returned is low, a charging time may need to be secured. As a result, it takes a time until a next request for rental can be accepted, with the result that the electric vehicle may be unable to be rented efficiently. Hence, it is required to set a rental fee for providing a user with a motivation for returning the electric vehicle in such a manner that the returned vehicle can be smoothly rented next.

Therefore, in the present embodiment, when the SOC of battery 214 at the time of returning of the electric vehicle is large, management server 100 is configured to set the rental fee to be lower than the rental fee set when the SOC of battery 214 at the time of returning of the electric vehicle is small. In the present embodiment, management server 100 corresponds to a "rental fee setting apparatus."

In this way, when the SOC at the time of returning is large, the rental fee becomes lower than the rental fee set when the SOC at the time of returning is small, thereby providing the user with a motivation for returning the electric vehicle with a large SOC. As a result, a charging time to be secured becomes short when the electric vehicle is returned with a large SOC, thereby shortening a time until a next request for rental can be accepted. As a result, the electric vehicle can be rented efficiently.

In the following description, for example, a case in which an electric vehicle is utilized by rental as a manner of utilizing the electric vehicle will be described as an example.

<Renting Process in Management Server 100>

For example, by receiving predetermined information via a station from a vehicle to be rented (hereinafter, referred to as the "rental vehicle"), management server 100 specifies the rental vehicle, date and time (hereinafter, referred to as "renting date and time") of the renting, a user, a renting location, and a SOC of a battery mounted in the rental vehicle, and stores the pieces of specified information into storage 104 in association with one another.

For example, management server 100 specifies, as the renting date and time, the date and time of receiving the predetermined information. Moreover, management server 100 specifies, as the renting location, a station to which the predetermined information is transmitted, for example.

For example, the predetermined information includes: renting information indicating that an renting operation has been performed in the rental vehicle; user-specifying information for specifying the user; information for specifying the rental vehicle; and SOC information indicating a SOC of battery 214 at the time of start of the utilization. The renting operation includes an operation of unlocking a door of the rental vehicle, for example.

Storage 104 of management server 100 stores identification information of a user having made utilization registration, and the user having made utilization registration is given a card key having a storage medium in which the identification information is stored, for example. When the user performs a reading operation by, for example, holding the card key over a card reader provided in the rental vehicle, the door of the rental vehicle is unlocked by an actuator and the identification information of the card key is read. When the door of the rental vehicle is unlocked, the rental vehicle transmits, as the user-specifying information, the information for specifying the rental vehicle and the identification information read from the card key, to management server 100 via the station. When the door of the rental vehicle is unlocked, the rental vehicle calculates the SOC of battery 214 and transmits the calculated SOC as the SOC information to management server 100 via the station together with the other information.

<Setting of Rental Fee>

When the rental vehicle is returned, management server 100 specifies a station serving as the returning location and date and time (returning date and time), and calculates a utilization time from the renting date and time and the returning date and time. Management server 100 sets a rental fee by multiplying the calculated utilization time by a unit price per predetermined period of time (for example, a fee per hour).

Management server 100 obtains the utilization history from the rental vehicle via the station, and sets a fee-returning rate based on the utilization history. Management server 100 calculates a fee-returning amount by multiplying the rental fee by the set fee-returning rate so as to set a rental fee to be billed to the user, provides a rebate by cash corresponding to the calculated fee-returning amount, provides a voucher corresponding to the calculated fee-returning amount, or provides various types of points corresponding to the calculated fee-returning amount.

<Rental Fee Setting Process>

Hereinafter, a rental fee setting process will be described in detail with reference to FIG. 3. FIG. 3 is a flowchart showing the rental fee setting process. In the present embodiment, the rental fee setting process will be described as being executed by management server 100 (more specifically, CPU 102 of management server 100) for the sake of illustration. While each step shown in the flowchart shown in FIG. 3 is implemented by software processing done by management server 100, a part thereof may be implemented by hardware (or electric circuitry) fabricated in management server 100. In the process described below, it may be illustratively described that vehicle 200 is returned to station 150.

In step ("S") 100, management server 100 determines whether a rented electric vehicle is returned.

For example, management server 100 may determine that the rented electric vehicle is returned when management server 100 receives, from vehicle 200 via station 150, the user information for specifying the user or the vehicle and the return information indicating that a returning operation has been done to vehicle 200. The returning operation includes, for example, an operation of parking vehicle 200 at station 150 to which the vehicle is returned, and locking the door of vehicle 200. The operation of locking the door includes an operation of holding the card key over the card reader of vehicle 200, for example. When the card key is held over the card reader, vehicle 200 performs an operation of locking the door by operating the actuator, and performs an operation of reading the information of the card key via the card reader. Vehicle 200 transmits the read identification information of the card key and the return information as the user information to management server 100 via station 150.

Alternatively, for example, management server 100 may determine that the rented electric vehicle is returned when receiving the user information and the return information from station 150 as a result of an operation by an administrator of station 150 serving as the returning location.

It should be noted that the above-described methods of determining whether an electric vehicle is returned are merely examples, and are not exclusive. When it is determined that the rented electric vehicle is returned (YES in S100), the process proceeds to S102.

In S102, management server 100 obtains the returning date and time, the station information for the returning location, and the utilization history of vehicle 200. For example, management server 100 obtains, as the returning date and time, the date and time at which vehicle 200 is determined to be returned.

The station information for the returning location is information for specifying the location of station 150, and is a station ID provided to each station, for example. Storage 104 of management server 100 stores information for associating the station ID with the location of the station. For example, during communication with station 150, management server 100 receives the station ID from station 150 as the station information for the returning location.

Further, management server 100 obtains the utilization history from vehicle 200 via station 150. The utilization history has been described above and therefore will not be described in detail repeatedly.

For example, when it is determined that the electric vehicle is returned, management server 100 transmits a transmission request for the utilization history to returned vehicle 200 via station 150. In response to the request from management server 100 to transmit the utilization history, controller 204 of vehicle 200 transmits, to management server 100 via station 150, the utilization history stored in storage 206. It should be noted that controller 204 obtains the utilization history whenever a predefined time passes during the utilization, and stores it into storage 206. Further, when controller 204 transmits the utilization history to management server 100 in response to the transmission request, controller 204 may delete the utilization history stored in storage 206 or may delete the utilization history when the vehicle is rented next time.

In S104, management server 100 sets a fee-returning rate A(1) based on the SOC at the time of renting. For example, when the SOC of the battery at the time of renting is small, fee-returning rate A(1) is set to a value larger than a value set when the SOC at the time of renting is large. When the SOC at the time of renting is small, a distance in which vehicle 200 can travel is shorter than that when the SOC at the time of renting is large. Therefore, by increasing the fee-returning rate for a user who accepts such an SOC, a motivation for renting a vehicle with a small SOC in battery 214 at the time of renting can be provided to users.

FIG. 4 is a diagram for illustrating an exemplary fee-returning rate set in accordance with the SOC at the time of renting. As shown in FIG. 4, for example, SOCs at the times of renting are classified by a plurality of threshold values (e.g., a first threshold value for dividing a large value area and a medium value area and a second threshold value for dividing the medium value area and a small value area) into the large, medium and small value areas, and a map in which a fee-returning rate is set for each classification is previously stored in storage 104. Management server 100 makes reference to the map to set a different fee-returning rate A(1) depending on what classification the SOC at the time of renting corresponds to.

For example, when the SOC at the time of renting falls within the large value area, management server 100 sets a fee-returning rate A(1) of 0%. Further, when the SOC at the time of renting falls within the medium value area, management server 100 sets a fee-returning rate A(1) of 2%. When the SOC at the time of renting falls within the small value area, management server 100 sets a fee-returning rate A(1) of 5%. The numerical values of the fee-returning rates described above and below are mere examples and are not a limitation. Furthermore, while the fee-returning rates described above and below are described by referring as one example to a case of setting them in three stages, they may be set in a plurality of stages such as two or four or more stages.

Returning to FIG. 3, in S106, management server 100 sets a fee-returning rate A(2) based on the SOC at the time of returning. Management server 100 obtains the SOC at the time of returning from the utilization history of vehicle 200 obtained at the time of returning, for example. For example, when the SOC of the battery at the time of returning is large, fee-returning rate A(2) is set to a value larger than a value set when the SOC at the time of returning is small. When the SOC at the time of returning is large, a charging time for battery 214 for next rental becomes shorter than that when the SCO at the time of returning is small. Therefore, by increasing the fee-returning rate for a user who utilizes vehicle 200 in such a utilization manner, a motivation for utilizing the vehicle in such a utilization manner that the SOC of battery 214 at the time of returning is increased can be provided to users.

FIG. 5 is a diagram for illustrating an exemplary fee-returning rate set in accordance with the SOC at the time of returning. As shown in FIG. 5, for example, SOCs at the times of returning are classified by a plurality of threshold values (e.g., a first threshold value for dividing a large value area and a medium value area and a second threshold value for dividing the medium value area and a small value area) into the large, medium and small value areas, and a map in which a fee-returning rate is set for each classification is previously stored in storage 104. Management server 100 makes reference to the map to set a different fee-returning rate A(2) depending on what classification the SOC at the time of returning corresponds to.

For example, when the SOC at the time of returning falls within the large value area, management server 100 sets a fee-returning rate A(2) of 5%. When the SOC at the time of returning falls within the medium value area, management server 100 sets a fee-returning rate A(2) of 2%. When the SOC at the time of returning falls within the small value area, management server 100 sets a fee-returning rate A(2) of 0%.

Returning to FIG. 3, in S108, management server 100 sets fee-returning rate A(3) based on the number of times of performing behaviors contributing to the deterioration of the battery during a period of utilization from the renting of the vehicle to the returning of the vehicle. For example, when the number of times of performing the behaviors contributing to the deterioration of the battery is small, fee-returning rate A(3) is set to a value larger than a value set when the number of times of performing the behaviors contributing to the deterioration of the battery is large. When the number of times of performing the behaviors contributing to the deterioration of the battery is small, a degree of deterioration of the battery becomes small. Therefore, by increasing the fee-returning rate for a user who utilizes the vehicle in such a utilization manner, a motivation for utilizing the vehicle in such a utilization manner that the number of times of performing the behaviors contributing to the deterioration of the battery is reduced can be provided to users.

Specifically, the number of times of performing the behaviors contributing to the deterioration of the battery includes at least one of the number of times of charging/discharging the battery and the number of times of performing quick electric charging. For example, the number of times of performing the behaviors may be only the number of times of charging, the number of times of performing the behaviors may be only the number of times of discharging, the number of times of performing the behaviors may be a total of the number of times of charging and the number of times of discharging, or the number of times of performing the behaviors may be only the number of times of performing quick electric charging.

For example, management server 100 may increase, by one, the number of times of charging whenever an amount of increase of the SOC of battery 214 per predetermined time exceeds a threshold value. Alternatively, management server 100 may increase, by one, the number of times of discharging whenever an amount of decrease of the SOC of battery 214 per predetermined time exceeds a threshold value. Management server 100 may increase, by one, the number of times of performing quick electric charging whenever an amount of increase of the SOC of battery 214 in a period shorter than the above-described predetermined time exceeds a threshold value.

FIG. 6 is a diagram for illustrating an exemplary fee-returning rate set in accordance with the number of times of performing the behaviors contributing to the deterioration of the battery during utilization. As shown in FIG. 6, for example, the numbers of times of performing the behaviors contributing to deteriorations of batteries are classified by a plurality of threshold values (e.g., a first threshold value for dividing a large value area and a medium value area and a second threshold value for dividing the medium value area and a small value area) into the large, medium and small value areas, and a map in which a fee-returning rate is set for each classification is previously stored in storage 104. Management server 100 makes reference to the map to set a different fee-returning rate A(3) depending on what classification the number of times of performing the behaviors contributing to the deterioration of the battery during the utilization corresponds to.

For example, when the number of times of performing the behaviors contributing to the deterioration of battery 214 during the utilization falls within the large value area, management server 100 sets a fee-returning rate A(3) of 0%. Further, when the number of times of performing the behaviors contributing to the deterioration of battery 214 during the utilization falls within the medium value area, management server 100 sets a fee-returning rate A(3) of 2%. When the number of times of performing the behaviors contributing to the deterioration of battery 214 during the utilization falls within the small value area, management server 100 sets a fee-returning rate A(3) of 5%.

Returning to FIG. 3, in S110, management server 100 sets fee-returning rate A(4) based on a leaving time in a state contributing to the deterioration of the battery during the utilization. For example, when the leaving time in the state contributing to the deterioration of the battery is short, fee-returning rate A(4) is set to a value larger than a value set when the leaving time in the state contributing to the deterioration of the battery is long. When the leaving time in the state contributing to the deterioration of the battery during the utilization is short, a degree of deterioration of the battery becomes small. Therefore, by increasing the fee-returning rate for a user who utilizes the vehicle in such a utilization manner, a motivation for utilizing a vehicle in such a utilization manner that the leaving time in the state contributing to the deterioration of the battery become short can be provided to users.

For example, the leaving time in the state contributing to the deterioration of the battery may be: a first leaving time during which the battery is left in a fully charged state in which the SOC of the battery is higher than a threshold value; a second leaving time during which the battery is left in an over-discharged state in which the SOC of the battery is lower than a threshold value; the first leaving time or second leaving time under a high-temperature environment in which an external air temperature is higher than a threshold value; or the first leaving time or second leaving time under a low-temperature environment in which an external air temperature is lower than a threshold value. For example, vehicle 200 measures an elapsed time while the conditions for the SOC of battery 214 and the external air temperature are established during the utilization, calculates the first leaving time or second leaving time by adding the elapsed time to the previously measured time, and stores it into storage 206.

FIG. 7 is a diagram for illustrating an exemplary fee-returning rate set in accordance with the leaving time in the state contributing to the deterioration of the battery during the utilization. As shown in FIG. 7, for example, times are classified by a plurality of threshold values (e.g., a first threshold value for dividing a long period and a medium period and a second threshold value for dividing the medium period and a short period) into the long, medium and short periods, and a map in which a fee-returning rate is set for each classification is previously stored in storage 104. Management server 100 makes reference to the map to set a different fee-returning rate A(4) depending on what classification the leaving time in the state contributing to the deterioration of the battery during the utilization corresponds to.

For example, when the leaving time in the state contributing to the deterioration of battery 214 during the utilization is the long period, management server 100 sets a fee-returning rate A(4) of 0%. When the leaving time in the state contributing to the deterioration of battery 214 during the utilization is the medium period, management server 100 set a fee-returning rate A(4) of 2%. When the leaving time in the state contributing to the deterioration of battery 214 during the utilization is the short period, management server 100 sets a fee-returning rate A(4) of 5%.

Returning to FIG. 3, in S112, management server 100 sets a correction coefficient in accordance with whether or not a behavior contributing to the deterioration of the battery results from the utilization manner of the user. For example, when the number of times of charging using charging stand 300 exceeds a threshold value, management server 100 determines that the behavior contributing to the deterioration of the battery results from the utilization manner of the user. On the other hand, for example, when the number of times of charging without using the charging stand exceeds a threshold value as in the case where an amount of regenerative braking is large or the like, management server 100 determines that the behavior contributing to the deterioration of the battery does not result from the utilization manner of the user (i.e., the behavior results from the performance of the battery).

FIG. 8 is a diagram for illustrating an exemplary correction coefficient set in accordance with a cause of the behavior contributing to the deterioration of the battery. For example, as shown in FIG. 8, a map in which a correction coefficient is set for each of the case where the behavior results from the utilization manner of the user and the case where the behavior results from the performance of the battery is stored in storage 104 in advance. Management server 100 makes reference to the map so as to set a different correction coefficient depending on whether or not the behavior results from the utilization manner of the user. This correction coefficient is used as a correction coefficient of fee-returning rate A(3), for example.

For example, when the behavior results from the utilization manner of the user, management server 100 sets a correction coefficient of 0.5. On the other hand, when the behavior results from the performance of the battery, management server 100 sets a correction coefficient of 1.0.

Returning to FIG. 3, in S114, management server 100 sets fee-returning rate A(5) in accordance with the returning location for the vehicle. For example, when a station to which the vehicle is returned is located within a predefined range, fee-returning rate A(5) is set to allow the rental fee to be lower than the rental fee when the station is located outside the predefined range. Examples of the predefined range may include: a region located in a predetermined region and involving a comparatively large number of times of utilizing vehicles in predetermined day(s) (for example, one day); a region involving a comparatively large number of reservations therefor in predetermined day(s); or a region involving a comparatively large number of times of utilizing vehicles based on a past utilization record. Alternatively, examples of the predefined range may include: a region located in a predetermined region and involving a comparatively small number of times of utilizing vehicles in predetermined day(s); a region involving a comparatively small number of reservations therefor in predetermined day(s); or a region involving a comparatively small number of times of utilizing vehicles based on a past utilization record.

FIG. 9 is a diagram for illustrating an exemplary fee-returning rate set in accordance with a returning location. As shown in FIG. 9, for example, returning locations are classified into a location in the predefined range and a location outside the predefined range, a map in which a fee-returning rate is set for each classification is stored in storage 104 in advance. Management server 100 makes reference to the map to set a different fee-returning rate A(5) depending on what classification the returning location corresponds to.

For example, when the returning location is in the predefined range, management server 100 sets a fee-returning rate A(5) of 5%. When the returning location is outside the predefined range, management server 100 sets a fee-returning rate A(5) of 0%. It should be noted that as the predefined range, a plurality of predefined ranges may be set or a range involving a different fee-returning rate may be set separately. Moreover, the predefined range may be always set to be the same range or may be set to be a different range depending on date and time. The predefined range may be set to a location to which the business entity utilizing the above-mentioned rental system wishes to move the vehicle (such as a busy location, a station having no vehicle, or the like), for example.

Returning to FIG. 3, in S116, management server 100 sets fee-returning rate A(6) in accordance with a returning time of vehicle 200. For example, when the returning time of the vehicle is in a predefined time zone, fee-returning rate A(6) sets the rental fee to be lower than the rental fee set when the returning time of the vehicle is outside the predefined time zone.

Examples of the predefined time zone include: a time zone involving a comparatively large number of times of utilizing vehicles in a station in one day; or a time zone involving a comparatively large number of times of utilizing vehicles based on a past utilization record. Alternatively, examples of the predefined time zone include: a time zone involving a comparatively small number of times of utilizing vehicles in a station in one day; or a time zone involving a comparatively small number of times of utilizing vehicles based on a past utilization record.

It should be noted that the predefined time zone may be always set to be the same time zone, may be set to be a different time zone depending on day and month, or may be set to be a different time zone for each station. The predefined range may be set to a time zone (such as a busy time zone or a midnight zone) during which the business entity utilizing the above-mentioned rental system wishes to move the vehicle, for example.

FIG. 10 is a diagram for illustrating an exemplary fee-returning rate set in accordance with a returning time. As shown in FIG. 10, for example, returning dates and times are classified into date and time within the predefined time zone and date and time outside the predefined time zone, and a map in which a fee-returning rate is set for each classification is stored in storage 104 in advance. Management server 100 makes reference to the map to set a different fee-returning rate A(6) depending on what classification the returning time corresponds to.

For example, when the returning time is in the predefined time zone, management server 100 sets a fee-returning rate A(6) of 5%. When the returning time is outside the predefined time, management server 100 sets a fee-returning rate A(6) of 0%.

Returning to FIG. 3, in S118, management server 100 determines the fee-returning rate. Specifically, the fee-returning rate is determined by adding, to a total of fee-returning rates A(1), A(2), A(4), A(5), and A(6), a value obtained by multiplying fee-returning rate A(3) by the correction coefficient.

In S120, management server 100 calculates a fee-returning amount corresponding to the determined fee-returning rate. Management server 100 sets the rental fee by multiplying, by the utilization time, the rental fee per unit time, for example. Management server 100 calculates the fee-returning amount by multiplying the set rental fee by the fee-returning rate. Management server 100 returns, to the user, points corresponding to the calculated fee-returning amount. For example, management server 100 reflects the returned points to point information of the user information registered in advance.

Management server 100 may perform a billing process for billing the rental fee to the user, management server 100 may perform a settlement process for settling up the rental fee if the user has selected automatic payment using information such as a credit card registered in advance, or management server 100 may notify the rental fee and the fee-returning rate to a mobile terminal owned by the user. On this occasion, management server 100 may notify details of fee-returning rates A(1) to A(6) and the correction coefficient to the mobile terminal of the user, for example.

<Operation of Management Server 100 Serving as Rental Fee Setting Apparatus>

An operation of management server 100 which is a rental fee setting apparatus based on the above configuration and flowchart will now be described. For example, it is assumed that vehicle 200 is rented to a user and information about renting time and SOC at that time is stored in storage 104 upon the renting process.

When vehicle 200 is returned to station 150 by the user (YES in S100), management server 100 obtains the returning date and time and transmits, to station 150 serving as the returning location, a transmission request for utilization history of vehicle 200 to obtain the station information for the returning location and the utilization history of vehicle 200 (S102).

Management server 100 sets fee-returning rate A(1) based on the SOC at the time of renting (S104), and sets fee-returning rate A(2) based on the SOC at the time of returning (S106). Further, management server 100 sets fee-returning rate A(3) based on the number of times of performing the behaviors contributing to the deterioration of battery 214 (S108), and sets fee-returning rate A(4) based on the leaving time in the state contributing to the deterioration of battery 214 (S110). Further, management server 100 sets the correction coefficient based on the cause of the behavior contributing to the deterioration (S112). Then, management server 100 sets fee-returning rate A(5) based on the returning location (S114), and sets fee-returning rate A(6) based on the returning date and time (S116). Management server 100 determines the fee-returning rate by adding, to a total of fee-returning rates A(1), A(2), A(4), A(5), and A(6), a value obtained by multiplying fee-returning rate A(3) by the correction coefficient (S118). Then, management server 100 provides the user with points corresponding to the fee-returning amount calculated based on the determined fee-returning rate (S120).

<Function and Effect of Rental Fee Setting Apparatus>

As described above, according to the rental fee setting apparatus according to the present embodiment, when the SOC of battery 214 at the time of returning is large, the rental fee becomes lower than the rental fee when the SOC thereof is small, thereby providing the user with a motivation for returning the vehicle with the SOC of battery 214 being large. As a result, when the electric vehicle is returned with a large SOC, a charging time to be secured becomes short, thereby shortening a time until a next request for rental can be accepted. Accordingly, the electric vehicle can be rented efficiently. Hence, there can be provided a rental fee setting apparatus, a rental fee setting method and a rental fee setting system each for setting a rental fee for providing a user with a motivation for returning an electric vehicle in such a manner that the electric vehicle can be rented efficiently.

Further, when the SOC of battery 214 at the time of renting is small, the rental fee is lower than the rental fee when the SOC thereof is large, thereby providing the user with a motivation for renting an electric vehicle with a small SOC at the time of renting. As a result, a charging time to be secured becomes short, thereby shortening a time until a next request for rental can be accepted. Accordingly, the electric vehicle can be rented efficiently.

Further, when the degree of deterioration at the time of returning of the electric vehicle is small (i.e., when the number of times of performing the behaviors contributing to the deterioration is small or when the leaving time in the state contributing to the deterioration is short), the rental fee is lower than the rental fee when the degree of deterioration at the time of returning of the electric vehicle is large, thereby providing the user with a motivation for returning the electric vehicle with a small degree of deterioration. As a result, since the electric vehicle is returned with a small degree of deterioration, the life of the power storage device can be suppressed from being reduced significantly.

Further, when the deterioration of battery 214 does not result from the utilization history of the user, the rental fee becomes low, thereby providing the user with a motivation for utilizing the electric vehicle so as not to deteriorate battery 214. As a result, the life of battery 214 can be suppressed from being reduced significantly.

Further, when the position (returning location) of the electric vehicle at the time of returning is in the predefined range, the rental fee is lower than the rental fee when the position of the electric vehicle is outside the predefined range, thereby providing the user with a motivation for returning the electric vehicle to the location in the predefined range. As a result, for example, by setting the predefined range to a location involving a strong demand for rental of electric vehicles, the electric vehicle can be rented efficiently.

Further, when the returning time of the electric vehicle is in the predefined time zone, the rental fee is lower than the rental fee when the returning time is outside the predefined time zone, thereby providing the user with a motivation for returning the electric vehicle in the predefined time zone. As a result, for example, by setting the predefined time zone to a time zone involving a strong demand for rental of electric vehicles, the electric vehicle can be rented efficiently.

<Modifications>

In the above-described embodiment, it has been described that when the electric vehicle is returned, the fee-returning rate is set, the current rental fee is multiplied by the set fee-returning rate to calculate the fee-returning amount, and the points corresponding to the calculated fee-returning amount are provided; however, the fee-returning rate may be applied to a subsequent rental fee, or the returning amount may be reflected in the subsequent rental fee, for example.

Further, in the above-described embodiment, it has been described that management server 100 and vehicle 200 communicate with each other via station 150; however, management server 100 and vehicle 200 may be configured to communicate with each other directly not via station 150, for example. In this case, rental fee setting system 1 has a configuration in which stations 150, 180 and 190 of FIG. 1 are omitted, and a direct communication or an indirect communication via a predetermined communication network is performed between communication device 106 of management server 100 and communication devices 202 of vehicle 200.

Further, in the above-described embodiment, it has been described that the renting location and returning location are specified in accordance with the station ID received from station 150; however, the renting location and the returning location may be specified based on the positional information of vehicle 200 obtained using positional information acquisition device 210 of vehicle 200, for example.

In the above-described embodiment, it has been illustratively described that the fee-returning rate is set for the rental fee per unit time when vehicle 200, which is an electric vehicle, is rented; however, the above-described fee-returning rate may be applied when setting a monthly fee in the case of a lease type utilization manner in which vehicle 200 is rented until a predetermined period passes, or when setting a fee in accordance with a utilization time in the case of a sharing type utilization manner in which one vehicle or two or more vehicles are shared by a plurality of persons, for example. Alternatively, the above-described fee-returning rate may be applied when setting a monthly fee in the case of a battery lease type utilization manner in which only battery 214 is rented for a predetermined period instead of the electric vehicle.

Further, in the above-described embodiment, it has been described that the fee-returning rate is set for the rental fee; however, the fee may be set in any manner as long as the fee relatively becomes different, and it is not particularly limited to setting the fee-returning rate to reduce the rental fee. For example, a discount rate may be set instead of the fee-returning rate and a fee obtained by subtracting a discount amount corresponding to the discount rate from the rental fee may be set. Alternatively, an additional rate is set instead of the fee-returning rate and a fee obtained by increasing the rental fee by an additional amount corresponding to the additional rate may be set. Alternatively, part of fee-returning rates A(1) to A(6) may be replaced with additional rate(s) or discount rate(s).

Further, in the above-described embodiment, it has been described that fee-returning rates A(1) and A(3) to A(6) are set in addition to fee-returning rate A(2); however, for example, only fee-returning rate A(2) may be set or at least one of fee-returning rates A(1) and A(3) to A(6) may be set in addition to fee-returning rate A(2).

It should be noted that the above modifications may be implemented all together or may partially be implemented in combination.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A rental fee setting apparatus for an electric vehicle in which a power storage device is mounted, the rental fee setting apparatus comprising a central processing unit (CPU) for communicating with an electronic control unit (ECU) including a memory, a processor for executing programs stored in a memory, an input port for inputting signals and an output port for outputting signals, a monitoring device which is included in the electric vehicle, and an external air temperature sensor that senses the temperature around the vehicle and transmits a signal indicating the sensed external air temperature to the ECU, the monitoring device configured to detect a voltage, a current, and a temperature of the power storage device at a time of returning of the electric vehicle rented to a user, and calculate a state of charge (SOC) of the power storage device by using the detected voltage, current, and temperature of the power storage device; and the CPU being programmed to:

store in a storage device the calculated SOC of the power storage device at the time of returning of the electric vehicle rented to the user;

cause the storage device to store, as utilization history, information received from the ECU based on signals the ECU receives from the external temperature sensor and the monitoring device;

set a rental fee using the calculated SOC at the time of returning, and wherein when the calculated SOC at the time of returning is large, the CPU is further programmed to:

set the rental fee to be lower than the rental fee set when the calculated SOC at the time of returning is small, store, at the time of returning, information as to whether deterioration of the power storage device results from performance of the power storage device or results from a utilization manner of the user, and set the rental fee to be lower than the rental fee set when the deterioration of the power storage device results from the utilization manner of the user and when the deterioration of the power storage device results from the performance of the power storage device.

2. The rental fee setting apparatus according to claim 1, wherein the CPU is further programmed to set a current or subsequent rental fee using the SOC at the time of returning.

3. The rental fee setting apparatus according to claim 1, wherein the CPU is further programmed to store a SOC of the power storage device at a time of renting of the electric vehicle, and when the SOC at the time of renting is small, the CPU is further programmed to set the rental fee to be lower than the rental fee set when the SOC at the time of renting is large.

4. The rental fee setting apparatus according to claim 1, wherein the CPU is further programmed to store a degree of deterioration of the power storage device at the time of returning, and when the degree of deterioration of the power storage device at the time of returning is small, the CPU is further programmed to set the rental fee to be lower than the rental fee set when the degree of deterioration is large.

5. The rental fee setting apparatus according to claim 1, wherein the CPU is further programmed to store positional information of the electric vehicle at the time of returning, and the CPU is further programmed to set the rental fee to be different between a case where a position of the electric vehicle at the time of returning is in a predefined range and a case where the position of the electric vehicle at the time of returning is outside the predefined range.

6. The rental fee setting apparatus according to claim 1, wherein
the CPU is further programmed to store a clock time at the time of returning, and
the CPU is further programmed to set the rental fee to be different between a case where the clock time at the time of returning is in a predefined time zone and a case where the clock time at the time of returning is outside the predefined time zone.

7. A method for setting a rental fee of an electric vehicle in which a power storage device is mounted, the method comprising:
sensing, with an external air temperature sensor, the temperature around the vehicle;
detecting, by a monitoring device which is included in the electric vehicle, a voltage, a current and a temperature of the power storage device at a time of returning of the electric vehicle rented to a user;
calculating, by the monitoring device, a state of charge (SOC) of the power storage device by using the detected voltage, current, the external air temperature, and temperature of the power storage device;
storing in a storage device the calculated SOC of the power storage device at the time of returning of the electric vehicle rented to the user;
storing in the storage device, as utilization history, information received from signals received from the external temperature sensor and the monitoring device;
setting a rental fee using the stored SOC at the time of returning; and
setting, when the SOC at the time of returning is large, the rental fee to be lower than the rental fee set when the calculated SOC at the time of returning is small,
storing, at the time of returning, information as to whether deterioration of the power storage device results from performance of the power storage device or results from a utilization manner of the user, and
setting the rental fee to be lower than the rental fee set when the deterioration of the power storage device results from the utilization manner of the user and when the deterioration of the power storage device results from the performance of the power storage device.

8. A rental fee setting system comprising:
an electric vehicle in which a power storage device is mounted;
an electronic control unit (ECU) including a memory, a processor for executing programs stored in a memory, an input port for inputting signals and an output port for outputting signals, a monitoring device which is included in the electric vehicle, and an external air temperature sensor that senses the temperature around the vehicle and transmits a signal indicating the sensed external air temperature to the ECU; and
a server configured to set a rental fee of the electric vehicle,
the monitoring device being configured to
detect a voltage, a current and a temperature of the power storage device at a time of returning of the electric vehicle rented to a user, and
calculate a state of charge (SOC) of the power storage device by using the detected voltage, current and temperature of the power storage device,
the server being configured to
store in a storage device the calculated SOC of the power storage device at the time of returning of the electric vehicle rented to the user,
cause the storage device to store, as utilization history, information received from the ECU based on signals the ECU receives from the external temperature sensor and the monitoring device;
set the rental fee using the stored SOC at the time of returning, and set, when the calculated SOC at the time of returning is large, the rental fee to be lower than the rental fee set when the calculated SOC at the time of returning is small,
wherein the server is further programmed to store, at the time of returning, information as to whether deterioration of the power storage device results from performance of the power storage device or results from a utilization manner of the user, and
wherein when the deterioration of the power storage device results from the performance of the power storage device, the server is further programmed to set the rental fee to be lower than the rental fee set when the deterioration of the power storage device results from the utilization manner of the user.

9. The rental fee setting apparatus according to claim 1, wherein the CPU being further programmed to determine that the deterioration of the battery results from the utilization manner of the user when the number of times of charging using a charging stand exceeds a threshold value, and determine that the deterioration of the battery results from the performance of the battery when the number of times of charging without using the charging stand exceeds a threshold value.

10. The method for setting a rental fee of an electric vehicle according to claim 7, further comprising determining that the deterioration of the battery results from the utilization manner of the user when the number of times of charging using a charging stand exceeds a threshold value, and determining that the deterioration of the battery results from the performance of the battery when the number of times of charging without using the charging stand exceeds a threshold value.

11. The rental fee setting system according to claim 8, wherein the server being configured to determine that the deterioration of the battery results from the utilization manner of the user when the number of times of charging using a charging stand exceeds a threshold value, and determine that the deterioration of the battery results from the performance of the battery when the number of times of charging without using the charging stand exceeds a threshold value.

* * * * *